(12) United States Patent
Wang et al.

(10) Patent No.: US 11,033,099 B2
(45) Date of Patent: Jun. 15, 2021

(54) ELECTRIC BRUSH POWERED BY MAINS ELECTRICITY

(71) Applicant: FUJIAN NASHIDA ELECTRONIC INCORPORATED COMPANY, Fujian (CN)

(72) Inventors: Xin Wang, Fuzhou (CN); Jiangqun Chen, Fuzhou (CN); Huiyang Zheng, Fuzhou (CN); Zhou Lin, Fuzhou (CN)

(73) Assignees: Nine Stars Group (U.S.A.) Inc., Pomona, CA (US); Fujian Nashida Electronic Incorporated Company, Fujian (CN)

( * ) Notice: Subject to any disclaimer, the term of this patent is extended or adjusted under 35 U.S.C. 154(b) by 51 days.

(21) Appl. No.: 16/315,651

(22) PCT Filed: Apr. 27, 2017

(86) PCT No.: PCT/CN2017/082147
§ 371 (c)(1),
(2) Date: Jan. 6, 2019

(87) PCT Pub. No.: WO2018/133244
PCT Pub. Date: Jul. 26, 2018

(65) Prior Publication Data
US 2019/0231062 A1 Aug. 1, 2019

(30) Foreign Application Priority Data
Jan. 20, 2017 (CN) .......................... 201720069646.4

(51) Int. Cl.
*A46B 13/02* (2006.01)
*B08B 9/087* (2006.01)
(Continued)

(52) U.S. Cl.
CPC .............. *A46B 13/02* (2013.01); *A61C 17/34* (2013.01); *B08B 9/08* (2013.01); *B08B 9/087* (2013.01); *A46B 2200/3006* (2013.01)

(58) Field of Classification Search
CPC . A46B 13/02; A46B 2200/3006; A61C 17/34; B08B 9/08; B08B 9/087
See application file for complete search history.

(56) References Cited

U.S. PATENT DOCUMENTS

2017/0007384 A1* 1/2017 Wagner .............. A61C 17/3418

FOREIGN PATENT DOCUMENTS

CN         2257224 Y   *  7/1997
CN     203934820 U  * 11/2014

* cited by examiner

*Primary Examiner* — Shay Karls
(74) *Attorney, Agent, or Firm* — Raymond Y. Chan; David and Raymond Patent Firm (57) ABSTRACT

An electric brush powered by mains electricity includes a power converter, an upper housing, a lower housing, a push button switch, an electric motor, a speed reducer, an output rotation shaft, an adapter, a brush head and a seal ring. The speed reducer and the electric motor of a mechanical rotation part, and the push button switch and a low-voltage power socket of a circuit part are all mounted in an airtight housing inner cavity. Meanwhile, the brush head and a main body part are in a plugged-in connection. The brush head can be randomly changed to realise multiple purposes, so that the defects of the poor waterproofing performance and the single function of existing electric brushes can be thoroughly solved, thereby greatly improving the reliability and the convenience of the product.

16 Claims, 6 Drawing Sheets

(51) Int. Cl.
*A61C 17/34* (2006.01)
*B08B 9/08* (2006.01)

ELECTRIC BRUSH POWERED BY MAINS ELECTRICITY

CROSS-REFERENCE TO RELATED APPLICATIONS

This is a non-provisional application that claims the benefit of priority under 35U.S.C.§ 371 to international application number PCT/CN2017/082147, international filing date Apr. 27, 2017, wherein the entire contents of which are expressly incorporated herein by reference.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a cleaning electric brush powered by a mains electricity.

Description of Related Arts

Conventional teacups and feeding-bottles are usually washed by a manual brush, but the bottoms of the teacups and feeding-bottles are generally difficult to clean, the cleaning process is time-consuming and labor-intensive, and the cleaning efficiency is extremely low. An electric brush according to a prior art, such as a Chinese patent titled "waterproof electric brush" with Patent No. 201420321763.1 which discloses an electric brush using a battery, consumes a large amount of electricity for the battery, and the life of the battery is short. If a disposable battery is used, the used battery will cause environmental pollution and high cost of use. In addition, the battery is mounted inner the electric brush, which increases the weight thereof and is inconvenient to operate.

SUMMARY OF THE PRESENT INVENTION

The object of the invention is to overcome the drawbacks above, and provide an electric brush powered by a mains electricity. The electric brush is low in use-cost, safe to use, light in weight, reasonable in structure, simple in assembly and low in cost. Compared with the electric brushes according to the prior art, the electric brush according to the present invention is more practical.

The electric brush according to the present invention comprises: an upper housing; a lower housing; an electric motor; a speed reducer; an output rotation shaft; a power converter; an adapter; and a brush head, wherein the upper housing and the lower housing are screwed with each other, wherein the electric motor, the speed reducer and the output rotation shaft are arranged at an inner side of the upper housing and the lower housing, wherein the power converter, the adapter and the brush head are arranged at an outer side of the upper housing and the lower housing, wherein the brush head and the adapter are detachably coupled with each other, wherein the adapter is connected with the output rotation shaft, wherein the output rotation shaft is connected with a final stage gear of the speed reducer, wherein a primary stage gear of the speed reducer is connected with the electric motor, wherein the electric motor is electrically connected to an output end of the power converter by a button switch, wherein an input end of the power converter is connected to the mains electricity.

Further, the speed reducer has a planetary deceleration structure, wherein the speed reducer is sleeved at a bottom of the lower housing, and is fixed at the bottom of the lower housing by a screw, wherein the lower housing has a shaft hole, wherein one end of the output rotation shaft is connected to the final stage gear of the speed reducer, and the other end thereof is connected with the adapter through the shaft hole of the lower housing, wherein an output rotation shaft seal ring is sleeved between the output rotation shaft and the shaft hole of the lower housing.

Further, two lock slots are disposed within the upper housing, wherein a circuit board is mounted between the two lock slots, wherein the push button switch and a low-voltage power socket are soldered at the circuit board, wherein a hole are formed at an upper part of the upper housing, wherein a socket hole of the low-voltage power socket is mounted to align with the hole of the upper housing, wherein a press direction of the push button switch is aligned with a side of the upper housing.

Further, the output rotation shaft and the adapter are connected by a detachable buckling manner, wherein the output rotation shaft and the brush head are connected by a detachable buckling manner, which is convenient for replacing different brush heads for fitting different situations.

Further, an end hole is arranged at an end of the upper housing, wherein the end hole is used as a hanging hole or for a lanyard to pass therethrough.

Further, a side hole is formed at a side of the upper housing, wherein a button of the push button switch is mounted to aligned with the side hole, wherein a polycarbonate sheet is arranged to cover on the side hole, wherein a switch logo is marked on the polycarbonate sheet, wherein the polycarbonate sheet is closely attached to an outer surface of the side of the upper housing.

Further, the upper housing and the lower housing are screwed with each other in a thread engaging manner, and a stopper slot is arranged at a threaded portion, wherein a seal ring is sleeved at a connection portion of the upper housing and the lower housing for providing a waterproof effect A power converter of the electric brush powered by mains electricity according to the present invention isolates and converts the mains electricity into a safe 6V low-voltage direct current, the push button switch controls the on-off, so as to apply the 6V low-voltage direct current to the electric motor. The electric motor is arranged to rotate a shaft to drive a primary stage gear of the speed reducer. The purpose of the speed reducer is to convert a high-speed low torque of the electric motor to a low-speed high torque. A final stage gear of the speed reducer is connected with the output rotation shaft. The output rotation shaft is connected with the adapter. The adapter is connected with the brush head, and the rotation of the brush head can clean an utensil, such as a teacup and a bottle. Due to cleaning in a hand-held method, a diameter of each of the upper housing and the lower housing cannot be too large, otherwise it will be difficult to grip firmly. Therefore, it is reasonable to adopt a planetary deceleration structure, because a diameter of the planetary deceleration structure can be smaller. At the same time, a sleeve-type structure is adopted in which the speed reducer is disposed at a bottom of an inner cavity of the lower housing, and is fixed by a screw which is engaged with a screw hole at the bottom of the lower housing. This design can reduce the diameters of the upper housing and the lower housing. The structure of the upper housing and the lower housing which are screwed with each other in the threaded engaging manner provides an ideal waterproof effect. A stopper is arranged at a thread of the upper housing, and a stopper slot is arranged at a thread of the lower housing which has an effect that it is easy to screw in during assembly, and it is not easy to unscrew after the product is assembled in place. Since the upper housing and the lower housing are injection molded by injection mold, the push button switch is difficult to be mounted, so that two lock slots are disposed at an inner side of the upper housing, a circuit board can be inserted at the two lock slots, so as to be fixed, and the push button switch and a low-voltage power socket are soldered to the circuit board, which solves the problem of the installation of the push button switch. The purpose of the adoption of the adapter is to solve the problem of assembly, the output rotation shaft and the adapter are connected by a buckling manner to save time and labor during assembly. The adapter and the brush head are connected through a buckling connecting manner which is convenient for replacing different types of brush heads, and is adapted to different situations. An output rotation shaft seal ring is sleeved between the output rotation shaft and the shaft hole at the lower housing for providing a waterproof effect, and a seal ring is sleeved between the upper housing and the lower housing for providing a waterproof effect. A side hole is formed at a side of the upper housing, a button of the push button switch is mounted to align with the side hole which is covered by a polycarbonate sheet for providing a waterproof effect. In order to be convenient for a user, an end hole is formed at an end of the upper housing, and the end hole can be served as a hanging hole or for a lanyard to pass therethrough.

Compared with the prior art, the present invention is advantageous in that it is low in use-cost and is environmentally friendly, the diameter of the housing is relatively small which is convenient for a hand to hold on. The speed reducer, the electric motor and the push button switch are all mounted in the airtight inner cavity of the upper housing and the lower housing. The output rotation shaft and the shaft hole of the lower housing are sealed by the output rotation shaft seal ring. The upper housing and the lower housing are sealed by the seal ring. The push button switch and the upper housing are covered by the polycarbonate sheet. The aesthetic appearance of the invention is enhanced, and is also waterproof, simple in assembly and low in cost. It is more practical than the conventional electric brushes.

Additional advantages and features of the invention will become apparent from the description which follows, and may be realized by means of the instrumentalities and combinations particular point out in the appended claims.

Still further objects and advantages will become apparent from a consideration of the ensuing description and drawings.

These and other objectives, features, and advantages of the present invention will become apparent from the following detailed description, the accompanying drawings, and the appended claims.

Figure 1:
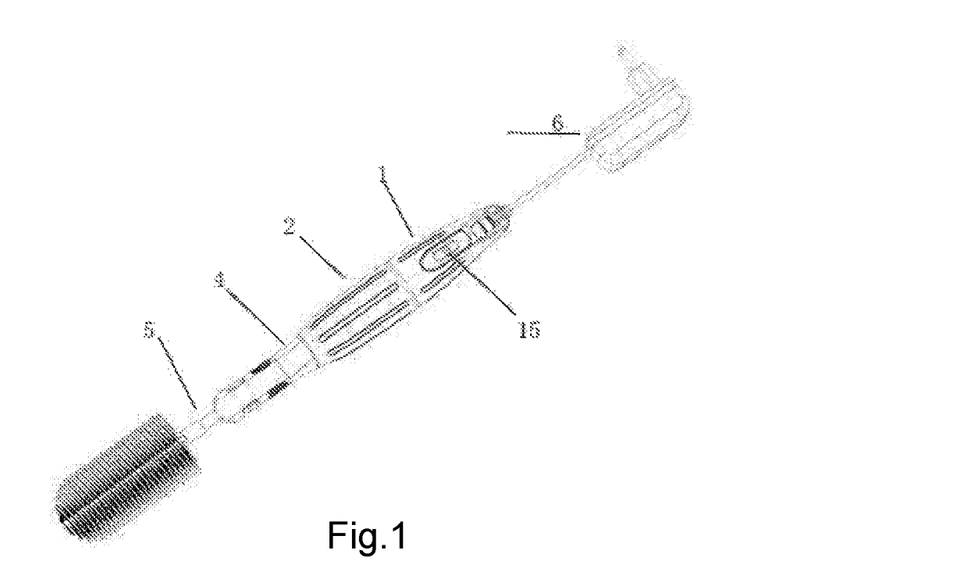
FIG. 1 is an outer schematic view of an electric brush powered by mains electricity according to the present invention.
Figure 2:
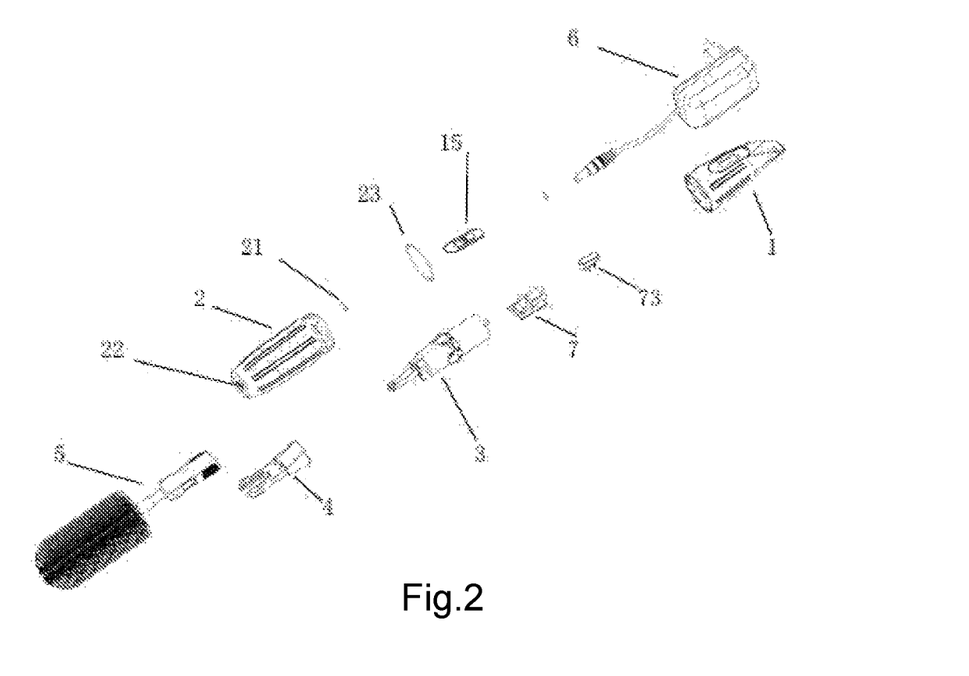
FIG. 2 is an exploded view of the electric brush powered by mains electricity according to the present invention.
Figure 3:
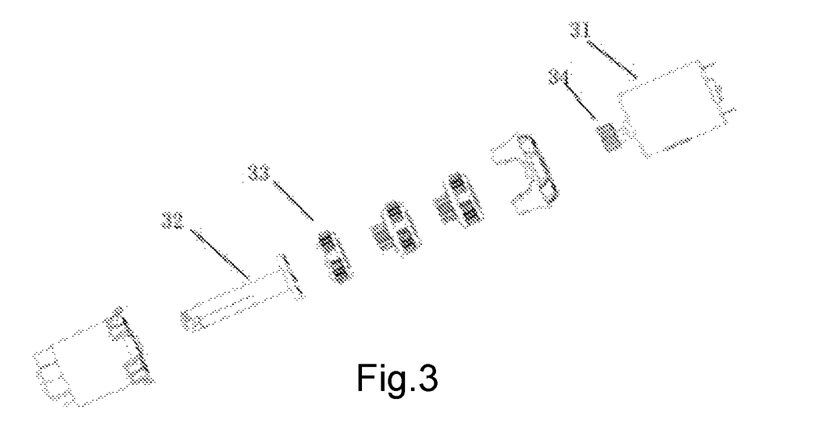
FIG. 3 is an exploded view of a speed reducer according to the present invention.
Figure 4:
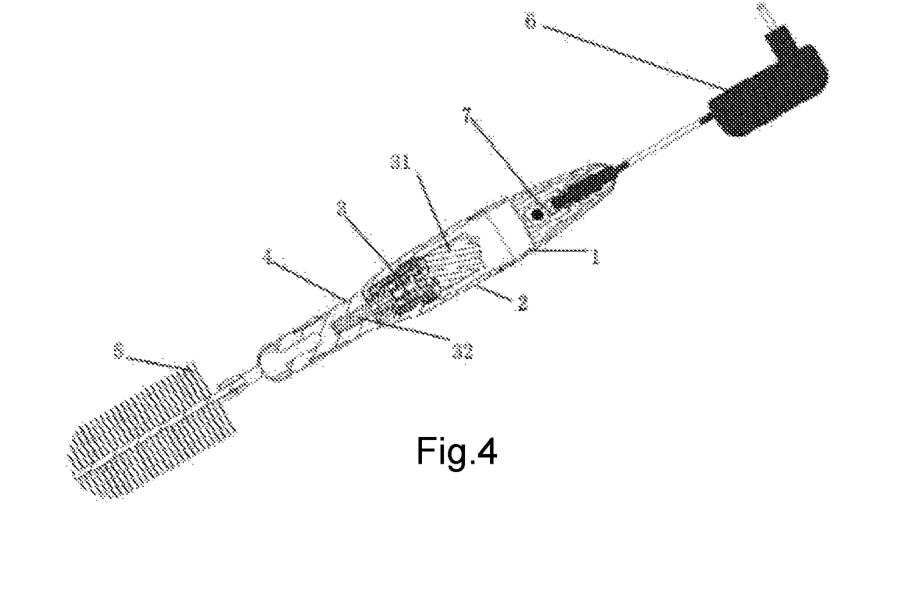
FIG. 4 is a sectional view of the electric brush powered by mains electricity according to the present invention.
Figure 5:
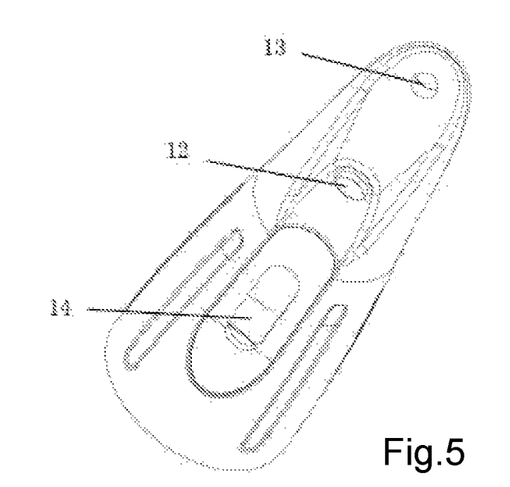
FIG. 5 is an outer schematic view of an upper housing of the electric brush powered by mains electricity according to the present invention.
Figure 6:
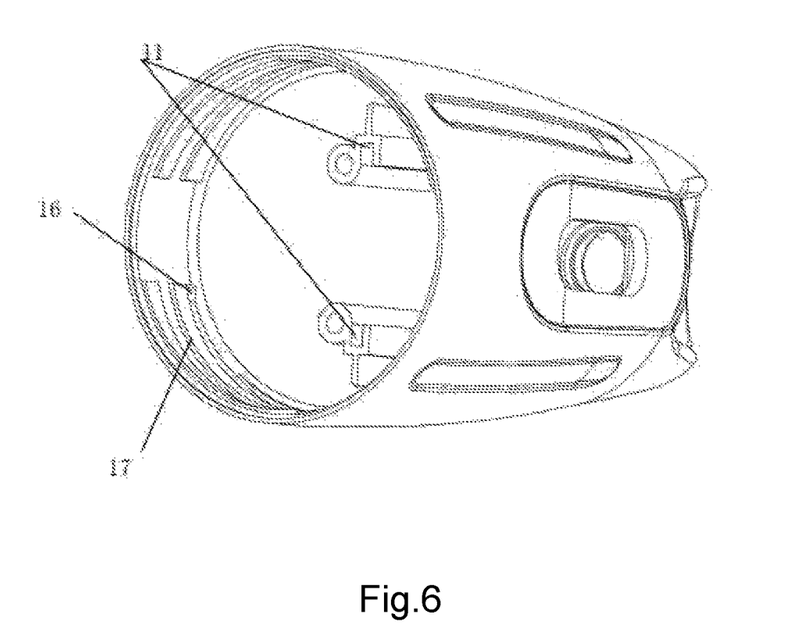
FIG. 6 is an inner schematic view of the upper housing of the electric brush powered by mains electricity according to the present invention.
Figure 7:
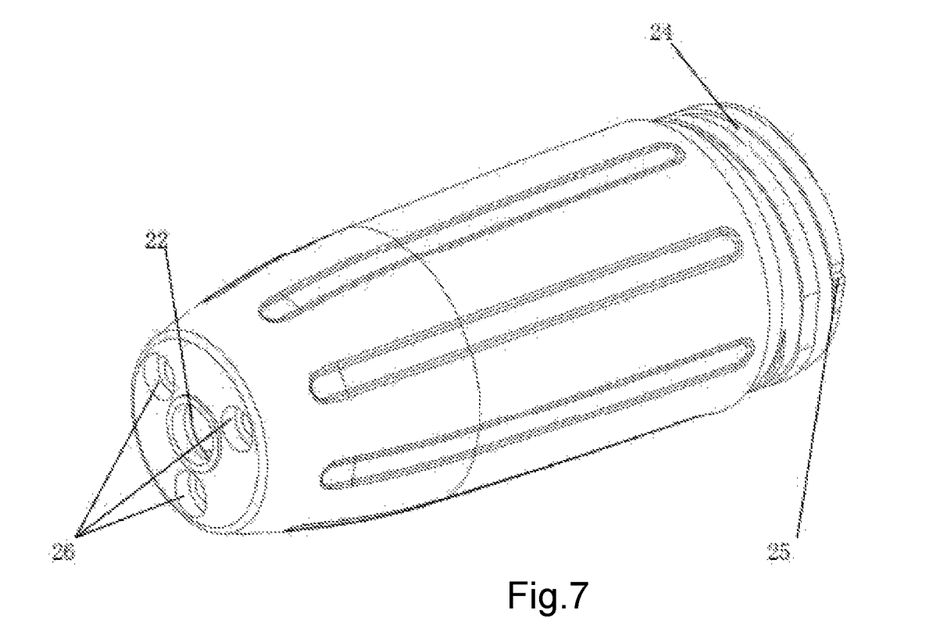
FIG. 7 is an outer schematic view of a lower housing of the electric brush powered by mains electricity according to the present invention.
Figure 8:
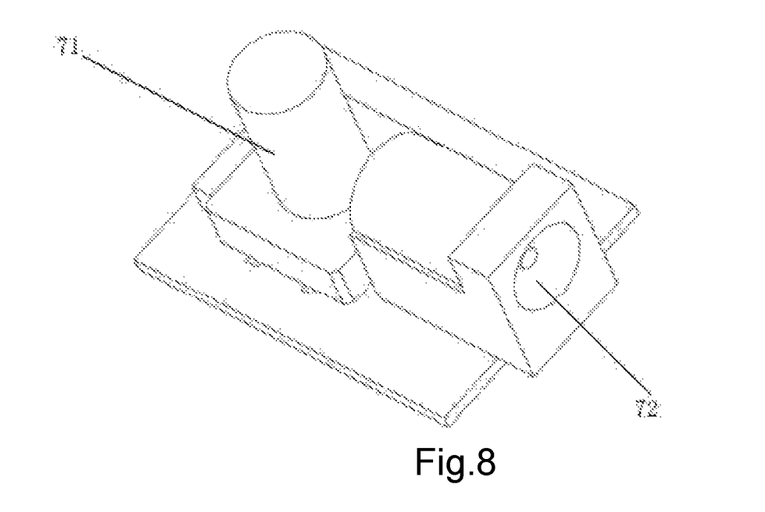
FIG. 8 is a schematic view of a circuit board of the electric brush powered by mains electricity according to the present invention.
Figure 9:
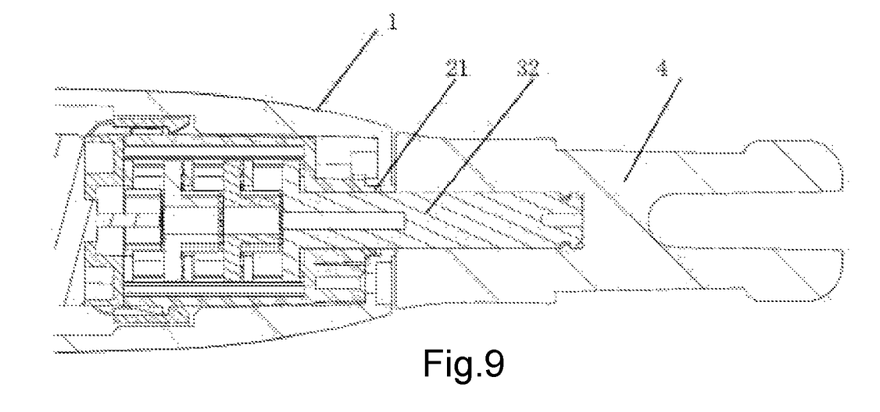
FIG. 9 is a partial schematic view of the electric brush powered by mains electricity according to the present invention.
Figure 10:
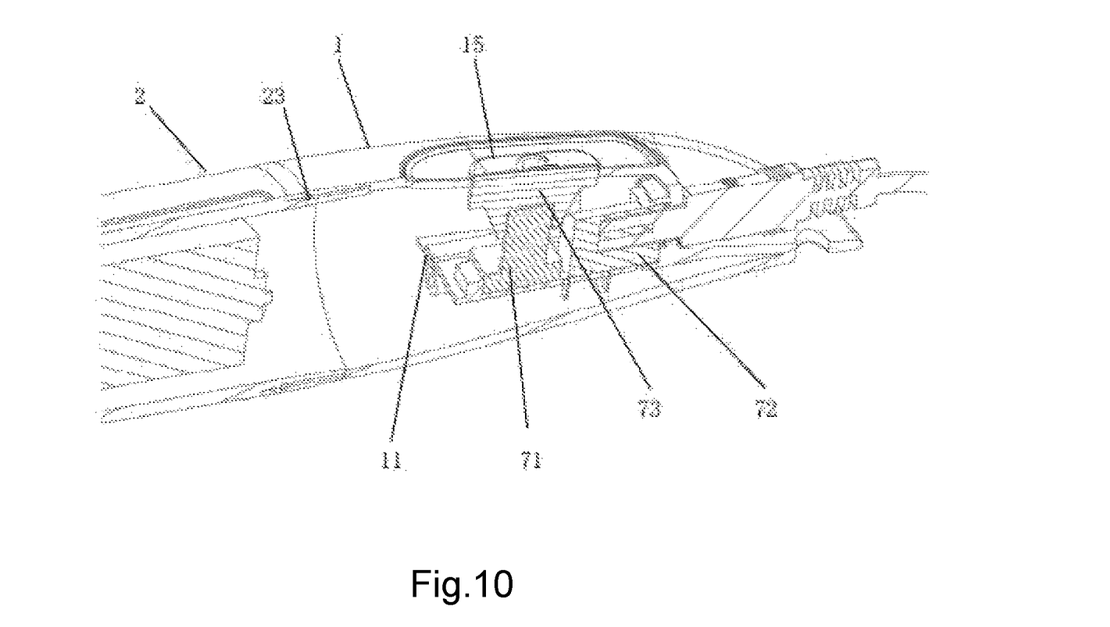
FIG. 10 is another partial schematic view of the electric brush powered by mains electricity according to the present invention.
Figure 11:
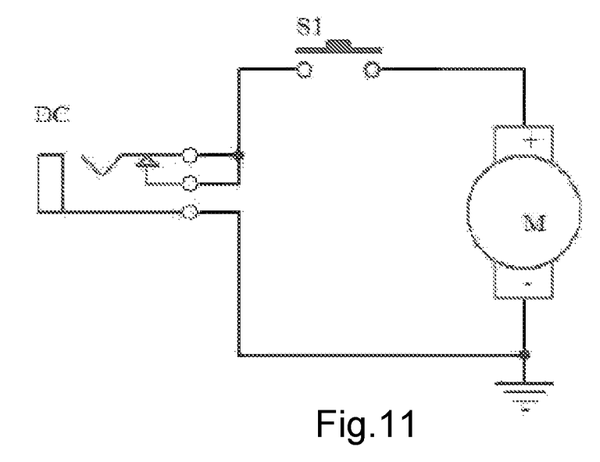
FIG. 11 is a schematic view illustrating a principle of an electronic circuit of the electric brush powered by mains electricity according to the present invention.

| | |
|---|---|
| 1 upper housing | 3 speed reducer |
| 11 lock slot inner the upper housing | 31 electric motor |
| 12 hole at an upper part of the upper housing | 32 output rotation shaft |
| 13 end hole of the upper housing | 33 final stage gear of the speed reducer |
| 14 side hole of the upper housing | 34 primary stage gear of the speed reducer |
| 15 PC chip | 4 adapter |
| 16 stopper | 5 brush head |
| 17 upper housing thread | 6 power converter |
| 2 lower housing | 7 circuit board |
| 21 output rotation shaft seal ring | 71 push button switch |
| 22 shaft hole at the bottom of the lower housing | 72 low-voltage power socket |
| 23 seal ring | 73 button |
| 24 lower housing thread | |
| 25 stopper slot | |
| 26 screw hole | |

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

The present invention comprises a power converter 6, an upper housing 1, a lower housing 2, a push button switch 71, an electric motor 31, a speed reducer 3, an output rotation shaft 32, an adapter 4, a brush head 5, and an output rotation shaft seal ring 21. The power converter 6 isolates and converts the mains electricity into a safe 6V low-voltage direct current, the push button switch 71 controls the on-off, so as to apply the 6V low-voltage direct current to the electric motor 31. The electric motor 31 is arranged to rotate a shaft to drive a primary stage gear 34 of the speed reducer. The purpose of the speed reducer 3 is to convert a high-speed low torque of the electric motor 31 to a low-speed high torque. A final stage gear 33 of the speed reducer 3 is connected with the output rotation shaft 32. The output rotation shaft 32 is connected with the adapter 4. The adapter 4 is connected with the brush head 5, and the rotation of the brush head 5 can clean an utensil, such as a teacup and a bottle. Due to cleaning in a hand-held method, a diameter of each of the upper housing 1 and the lower housing 2 cannot be too large, otherwise it will be difficult to grip firmly. Therefore, it is reasonable to adopt a planetary deceleration structure, because a diameter of the planetary deceleration structure can be smaller. At the same time, a sleeve-type structure is adopted in which the speed reducer 3 is disposed at a bottom of an inner cavity of the lower housing 2, and is fixed by a screw which is engaged with a screw hole 26 at the bottom of the lower housing 2. This design can reduce the diameters of the upper housing and the lower housing. The structure of the upper housing and the lower housing which are screwed with each other in the threaded engaging manner provides an ideal waterproof effect. A stopper 16 is arranged at a thread 17 of the upper housing, and a stopper slot 25 is arranged at a thread 24 of the lower housing which has an effect that it is easy to screw in during assembly, and it is not easy to unscrew after the product is assembled in place. Since the upper housing 1 and the lower housing 2 are injection molded by a mold, the push button switch is difficult to be mounted, so that two lock slots 11 are disposed at an inner side of the upper housing 1, a circuit board 7 can be inserted at the two lock slots 11, so as to be fixed, and the push button switch 71 and a low-voltage power socket 72 are soldered to the circuit board 7, which solves the problem of the installation of the push button switch 71. The purpose of the adoption of the adapter 4 is to solve the problem of assembly, wherein the output rotation shaft 32 and the adapter 4 are connected by a buckling manner to save time and labor during assembly. The adapter 4 and the brush head 5 are connected through a buckling connecting manner which is convenient for replacing different types of brush heads, and is adapted to different situations. An output rotation shaft seal ring 21 is sleeved between the output rotation shaft 32 and the shaft hole 22 at the lower housing for providing a waterproof effect, and a seal ring 23 is sleeved between the upper housing 1 and the lower housing 2 for providing a waterproof effect. A side hole 14 is formed at a side of the upper housing 1, a button 73 of the push button switch 71 is mounted to align with the side hole 14 which is covered by a polycarbonate sheet 15 for providing a waterproof effect. In order to be convenient for a user, an end hole 13 is formed at an end of the upper housing, and the end hole 13 can be served as a hanging hole or for a lanyard to pass therethrough.

Compared with the prior art, the present invention is advantageous in that it is low in use-cost and is environmentally friendly, the diameter of the housing is relatively small which is convenient for a hand to hold on. The speed reducer 3, the electric motor 31 and the push button switch 71 are all mounted in the airtight inner cavity of the upper housing 1 and the lower housing 2. The output rotation shaft 32 and the shaft hole 22 of the lower housing 2 are sealed by the output rotation shaft seal ring 21. The upper housing 1 and the lower housing 2 are sealed by the seal ring 23. The push button switch 71 and the upper housing 1 are covered by the polycarbonate sheet 15. The aesthetic appearance of the invention is enhanced, and is also waterproof, simple in assembly and low in cost. It is more practical than the conventional electric brushes.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An electric brush powered by mains electricity, comprising:
    a brush head;
    an upper housing having a lower end provided with at least two lock slots and a side hole formed at a side thereof;
    a lower housing having an upper end, a bottom and an inner cavity, wherein said upper end connected with said lower end of said upper housing;
    a power converter connecting to an upper end of said upper housing for converting mains electricity to a low-voltage direct current;
    an adapter adapted having a lower end connected to said brush head;
    an output rotation shaft arranged at a lower end of said lower housing and configured to be connect with an upper end of said adapter;
    an electric motor arranged in said inner cavity of said lower housing to rotate a shaft thereof;
    a primary stage gear arranged in said inner cavity of said lower housing to be driven by said shaft of said electric motor;
    a final stage gear arranged in said inner cavity of said lower housing and connected with said output rotation shaft;
    a speed reducer arranged in said lower housing and coupled between said primary stage gear and said final stage gear to convert a high-speed low torque of said electric motor through said primary stage gear to a low-speed high torque to said final stage gear to drive said output rotation shaft to rotate with said low-speed high torque, wherein said speed reducer has a planetary deceleration structure disposed at said inner cavity of said lower housing and affixed to said bottom of said lower housing in a threaded engaging manner; and
    a circuit board fixed at said two lock slots of said upper housing, wherein said circuit board comprises a push button switch controlling an on-off of said electric brush and a low-voltage power socket, wherein said push button switch further comprises a button mounted to aligned with said side hole of said upper housing and a polycarbonate sheet covering said push button switch and said upper housing, thereby providing a waterproof effect.

2. The electric brush, as recited in claim 1, wherein said lower housing having a lower thread provided at said upper end thereof and a stopper slot arranged at said lower thread of said lower housing, wherein said upper housing having an upper thread provided at said lower end thereof and a stopper arranged at said upper thread of said upper housing adapted for engaging with said stopper slot, wherein during assembly of said upper housing and said lower housing, said stopper and said stopper slot have an effect for ease of screwing in while not easy to unscrew after said upper housing and said lower housing are assembled in place.

3. The electric brush, as recited in claim 2, wherein said push button switch and said low-voltage power socket are soldered to said circuit board.

4. The electric brush, as recited in claim 3, wherein said bottom of said lower housing has two screw holes for screwing said speed reducer to fix said speed reducer at said bottom and disposed in said inner cavity of said lower end.

5. The electric brush, as recited in claim 4, wherein said bottom of said lower housing has a shaft hole and said outer rotation shaft further comprises an output rotation shaft seal ring sleeved between said output rotation shaft and said shaft hole at said lower housing, wherein said upper housing further comprises a seal ring sleeved between said upper housing and said lower housing, thereby providing a waterproof effect.

6. The electric brush, as recited in claim 3, wherein said bottom of said lower housing has a shaft hole and said outer rotation shaft further comprises an output rotation shaft seal ring sleeved between said output rotation shaft and said shaft hole at said lower housing, wherein said upper housing further comprises a seal ring sleeved between said upper housing and said lower housing, thereby providing a waterproof effect.

7. The electric brush, as recited in claim 2, wherein said bottom of said lower housing has two screw holes for screwing said speed reducer to fix said speed reducer at said bottom and disposed in said inner cavity of said lower end.

8. The electric brush, as recited in claim 7, wherein said bottom of said lower housing has a shaft hole and said outer rotation shaft further comprises an output rotation shaft seal ring sleeved between said output rotation shaft and said shaft hole at said lower housing, wherein said upper housing further comprises a seal ring sleeved between said upper housing and said lower housing, thereby providing a waterproof effect.

9. The electric brush, as recited in claim 2, wherein said bottom of said lower housing has a shaft hole and said outer rotation shaft further comprises an output rotation shaft seal ring sleeved between said output rotation shaft and said shaft hole at said lower housing, wherein said upper housing further comprises a seal ring sleeved between said upper housing and said lower housing, thereby providing a waterproof effect.

10. The electric brush, as recited in claim 1, wherein said push button switch and said low-voltage power socket are soldered to said circuit board.

11. The electric brush, as recited in claim 10, wherein said bottom of said lower housing has two screw holes for screwing said speed reducer to fix said speed reducer at said bottom and disposed in said inner cavity of said lower end.

12. The electric brush, as recited in claim 11, wherein said bottom of said lower housing has a shaft hole and said outer rotation shaft further comprises an output rotation shaft seal ring sleeved between said output rotation shaft and said shaft hole at said lower housing, wherein said upper housing further comprises a seal ring sleeved between said upper housing and said lower housing, thereby providing a waterproof effect.

13. The electric brush, as recited in claim 10, wherein said bottom of said lower housing has a shaft hole and said outer rotation shaft further comprises an output rotation shaft seal ring sleeved between said output rotation shaft and said shaft hole at said lower housing, wherein said upper housing further comprises a seal ring sleeved between said upper housing and said lower housing, thereby providing a waterproof effect.

14. The electric brush, as recited in claim 1, wherein said bottom of said lower housing has two screw holes for screwing said speed reducer to fix said speed reducer at said bottom and disposed in said inner cavity of said lower end.

15. The electric brush, as recited in claim 14, wherein said bottom of said lower housing has a shaft hole and said outer rotation shaft further comprises an output rotation shaft seal ring sleeved between said output rotation shaft and said shaft hole at said lower housing, wherein said upper housing further comprises a seal ring sleeved between said upper housing and said lower housing, thereby providing a waterproof effect.

16. The electric brush, as recited in claim 1, wherein said bottom of said lower housing has a shaft hole and said outer rotation shaft further comprises an output rotation shaft seal ring sleeved between said output rotation shaft and said shaft hole at said lower housing, wherein said upper housing further comprises a seal ring sleeved between said upper housing and said lower housing, thereby providing a waterproof effect.

* * * * *